Jan. 25, 1966 D. A. NEWMAN 3,230,875

THERMOGRAPHIC DUPLICATION

Filed Jan. 16, 1963

INVENTOR.
Douglas A. Newman
BY
Johnson and Kline
ATTORNEYS

United States Patent Office 3,230,87

Patented Jan. 25, 196

3,230,875

THERMOGRAPHIC DUPLICATION

Douglas A. Newman, Glen Cove, N.Y., assignor to Columbia Ribbon and Carbon Manufacturing Co., Inc., Glen Cove, N.Y., a corporation of New York

Filed Jan. 16, 1963, Ser. No. 251,836

12 Claims. (Cl. 101—149.4)

This invention relates to the art of imaging a copying master sheet by means of infrared radiation, original infrared radiation-absorbing images and a color-forming transfer sheet, and to the novel color-forming transfer sheet used therein.

Briefly, the art of imaging master sheets by means of infrared radiation, an imaged original sheet and a transfer sheet is based upon the fact that infrared radiation is converted to heat when it is absorbed by a foreign body. Thus, when an imaged original sheet is superposed with a transfer sheet and a master sheet and infrared radiation is directed against the original sheet, the radiation is absorbed by the images on the original and converted to heat. The heat is conducted to the transfer sheet and causes the transfer layer thereon to transfer to the master in areas corresponding to the imaged areas of the original. Such a method is fully disclosed in Roshkind U.S. Patent No. 2,769,391.

Although such a thermographic method offers many important advantages over the manual method of typing a master sheet, such as with hectograph dyestuff composition, it also gives rise to many problems because of the tendency of all known hectograph transfer sheets, in which the hectograph dyestuffs are contained in solid particulate form, to absorb infrared radiation to some degree, however slight, and convert it to heat. Thus, unless the amount of applied radiation is controlled within close limits, the hectograph transfer layer will become heated throughout and a partial or complete blocking-off of the layer to the master in unintended areas results.

For instance, when such conventional transfer layers are used in an infrared radiation exposure device such as a Thermo-Fax machine, the speed at which the superposed sheets are passed through the machine must be controlled very closely in that excessive speeds result in an exposure to radiation insufficient to cause fusing and transfer, while slow speeds result in over-exposure to radiation, excess fusing and transfer, and formation of master sheets which are neither sharply nor clearly imaged.

Obviously the optimum speed and duration of exposure varies with conditions such as the radiation-absorbing properties of the original images, the proximity and strength of the radiation source, the translucency of the original sheet and the ambient temperature of the Thermo-Fax machine. Therefore it is nearly impossible to select the optimum speed and duration of exposure each time it is desired to image a master sheet, so that it is generally necessary to waste one or more transfer sheet-master sheet combinations while attempting by trial and error to arrive at the optimum speed or duration of exposure.

With these problems and disadvantages in mind, it is an object of the present invention to provide a method for more reliably and more simply imaging a master sheet by means of infrared radiation.

It is another object of this invention to provide novel transfer sheets which are far less sensitive to infrared radiation than those heretofore known so that they will provide sharp and clear transfer to a master sheet under the effects of varying amounts of infrared radiation when exposed at various speeds through a Thermo-Fax machine or the like.

These and other objects and advantages of this i vention will be obvious to those skilled in the art in tl light of the following disclosure including the drawing in which.

Figure 1:
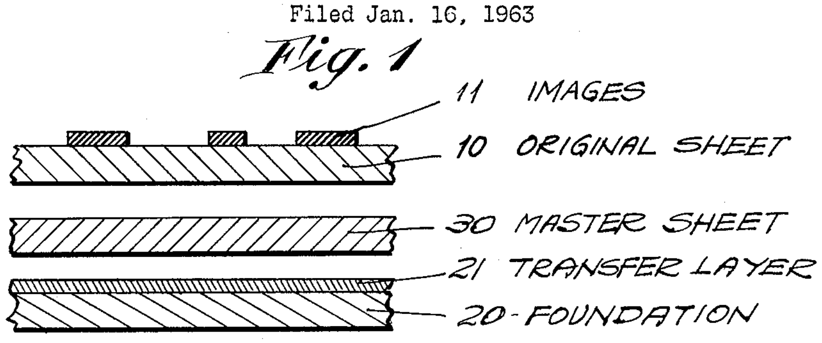
FIGURE 1 is a diagrammatic cross-section, to an e larged scale, of an imaged original sheet, a transfer she and a master sheet superposed under the effects of i frared radiation but separated for purposes of illustr tion.
Figure 2:
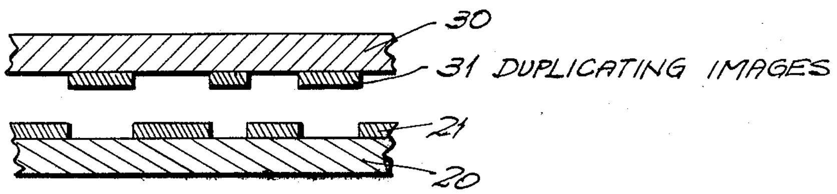
FIG. 2 is a diagrammatic cross-section, to an enlarge scale, of the transfer sheet and master sheet of FIG. after irradiation and separation and illustrating the dupl cating images transferred to the master sheet.

This invention was accomplished as a result of the di covery that the infrared radiation sensitivity of a tran fer sheet can be decreased sharply by using as the ima ing material a substantially colorless color-forming dy precursor of the bis (p-dialkylamainoaryl) methane ty and by also using as the transfer sheet foundation a tran lucent plastic-coated paper or clear plastic film.

It has been found that the combination of these limit tions appears to have a synergistic effect in that tl present transfer sheets may be exposed to much great amounts of radiation and for much longer periods time than conventional hectograph transfer sheets wit out any overall heating and melting of the transfer laye The novel thermotransfer sheets of this invention a translucent and are based upon a thin translucent plasti coated paper foundation or a clear plastic film found tion preferably having a caliper or thickness no great than about 2 mils. Such films are preferred over pap in that it has been discovered that they conduct heat ther through with much less tendency to conduct the he laterally or across the film than is the case with paper equal thickness. It is not known whether this is due the heat reflective properties of paper or to the fact th paper is composed of laterally extending fibers. In eith case, plastic film has been found to conduct the he pattern from the original images to the hectograph tran fer layer with a minium of lateral diffusion so that tl heated areas of the transfer layer correspond quite close to the sharpness and clarity of the original images.

The preferred plastic film foundations are those whic are heat-resistant and do not distort or crimp under tl effects of the high temperatures generated in the heate image areas, even when used as films having a caliper low as from 0.5 mil to 1.0 mil or so. Included in th preferred group are polyethylene terephthalate polyest films (Mylar), polyvinyl fluoride films (Teslar), pol tetrafluoroethylene films (Teflon), and the like. Al suitable are films such as polyvinylidene chloride (Saran polyvinyl chloride, high density polyolefins such as pol ethylene and polypropylene, certain cellulose acetate rubber hydrochloride (Pliofilm), and the like.

In place of the plastic film foundations, which a preferred, it is also possible to use plastic coated tran lucent papers as defined in my copending applicatio Serial No. 162,605, filed December 27, 1961.

The present transfer layer is substantially colorless an of the type which transfers as a mass or in a stencilin manner in the heated areas and contains the color-form ing bis (p-dialkylamioaryl) methane in the form of soli undeveloped particles so that the images transferred t the master sheet are not developed or tinted but rather co tain the concentrated dye precursor available for th imaging of numerous copy sheets in the spirit process.

The dye precursors used according to this inventio are the colorless or slightly colored bis (p-dialkylamin aryl) methanes which develop a bright color when co tacted with an acidic substance. Such substances a ːll known in the art although not for the purposes or in ɜ compositions of this invention.

The bis (p-dialkylaminoaryl) methane compounds are itical to the heat process of this invention in that they e substantially colorless and have an exceptionally high lor-forming potency which requires only a change of I to the acid side to render them brightly colored. This ceptional color-forming potentcy, which is about twice great as other colorless color-forming chemicals such the azo dye bases and the like, allows for their effec- re use in small amounts and thus in exceptionally thin ansfer layers having a thickness as low as about 0.3 il or less. Such thin layers are beneficial in that they e even more transparent to infrared radiation than rresponding thicker layers, and also provide sharper d clearer images. Even when used in layers having a liper of up to 1 mil or so, the present color-formers n be used in about one-half the amount which would be quired in the case of solid colorless azo dye bases to oduce the same color-forming potency. This reduces one-half the amount of the solids content of the trans- r layer and consequently increases the transparency of e layer to infrared radiation.

The transfer layers of this invention are formed by dis- rsing the color-forming compounds in a wax binder aterial together with an alkaline stabilizing agent and me oil and/or lanolin or the like, and then coating the ated composition onto the translucent foundation in e form of a thin layer having a thickness no greater than out 1.0 mil. The present color-formers are widely ed in pressure-sensitive transfer layers such as dis- osed by U.S. Patent No. 2,548,366 but generally in dis- lved or diluted form and encapsulated in a cellulosic or drophilic colloid binder material. Such binder mate- als are not usable according to this invention because of e infrared radiation-absorbing or reflecting properties the whitish colored colloids, and of course the dissolved diluted dye precursor is suitable only for the formation single copy images having no duplicating properties ability.

One problem generally encountered through the use of e present color-formers in non-encapsulated form has en overcome according to this invention. These color- rmers are developed by contact with an acid, and nearly l paper foundations are acidic due to the presence in e paper stock of alum used in the beater finish of the per. However, where neutral plastic film foundations coatings are used heerin, this problem is avoided. lso it has been found advantageous to add a small nount of an alkaline material such as triethanolamine use an alkaline wax binder such as Armid–HT wax to abilize the color-forming material against premature velopment. Armid–HT wax is composed of approxi- ately 22% palmitamide, 75% stearamide and 3% ole- nide.

The following example is set forth by way of illustration d should not be considered limitative:

EXAMPLE

Sheets of Mylar polyethylene terephthalate film having thickness of 0.5 mil were coated with an 0.5 mil thin yer of the following composition:

| gredients: | Parts by weight |
|---|---|
| Carnauba wax | 16.5 |
| Cardis mineral wax | 10.0 |
| Lanolin | 8.0 |
| Paraffin | 8.0 |
| Mineral oil (paraffin base) | 10.0 |
| Indopol (isobutylene polymer) | 4.0 |
| Armid–HT wax (if desired) | 1.5 |
| Bis (p-dimethylaminophenyl) piperidyl methane | 21.0 |
| 1,4-bis [bis(p-dimethylaminophenyl)-methyl] piperazine | 21.0 |

The formed coating was substantially colorless and the transfer sheets comprising the coating on the Mylar film were very translucent.

Next, as illustrated by FIG. 1 of the drawing, the transfer sheets comprising film foundation 20 and transfer layer 21 were superposed with thin translucent paper master sheets 30 having a smooth glazed working surface so that the transfer layer contacted the working surface of the master. Then original sheets 10 having typed images 11 thereon were superposed with the transfer and master sheets in the order shown in FIG. 1 and exposed to infrared radiation lamps in a Thermo-Fax machine at speed settings varying from 3 up to 9.

After exposure and separation of the sheets, the master sheet in each case was found to be imaged sharply and clearly with substantially colorless image deposits 31 transferred from transfer layer 21 in areas corresponding exactly to the location of the imaged areas of the original sheet. The masters imaged at machine speed settings of from about 5 to about 7 were more perfect with respect to sharpness and clarity although the masters imaged at each of the indicated speed settings were commercially satisfactory.

The master sheets were then mounted on the drum of a conventional spirit duplicating machine and a number of copy papers were imaged therewith. The conventional alcohol and water spirit duplicating fluid dissolved portions of the dye precursor causing it to transfer to the surface of successive copy sheets. The residual amounts of alum contained on the copy papers were sufficient to develop the dye precursors so that sharp and clear deep blue duplicate images were formed on the copy sheets.

If desired, small amounts of a weak acid such as lactic acid or benzoic acid may be added to the spirit duplicating fluid to hasten development of the dye precursors or to cause development in cases where the copy sheets are non-acidic or only very slightly acidic.

It has also been found that neutral duplicating fluid may be used in cases where a special acidic treatment or coating is applied to the copy sheets. Thus the copy sheets may be coated or impregnated with solutions of weak acids such as lactic or benzoic acid, or may be coated with acidic materials such as bentonite, kaolin, felspar, attapulgite or the like.

In place of the leuco dye precursors specifically mentioned in the example may be used one or a mixture of any of the equivalent materials disclosed in U.S. Patent No. 2,981,733. Other dye precursors which may be used include lactone dye bases such as crystal violet lactone, malachite green lactone or any of the other lactones disclosed in U.S. Patent No. 2,548,366; carbinol dye bases such as the carbinol base of malachite green and the like.

For purposes of unification and simplification, the dye precursor bases which may be used according to this invention are classified as bis (p-dialkylaminoaryl) methane compounds which is intended to include all acid-reacting dye bases having two or three p-dialkylamino groups attached to a single carbon atom, including the lactone derivatives as illustrated in U.S. Patent No. 2,548,366 in which the methane carbon is part of the lactone ring, and the N-heterocyclic substituted diphenyl methane derivatives of U.S. Patent No. 2,981,733.

The master sheets imaged according to this invention may be used to produce duplicate copies by means other than hectograph duplication means. For instance the present imaged masters may be superposed with their images in surface contact with the solid, heat-meltable coating on a copy sheet and subjected to heat or infrared radiation to cause the copy sheet coating to melt and dissolve some of the dye precursor from the master images to form a duplicate copy. Suitable copy sheet coatings are those based upon solid materials which, in their melted form, are solvents for the dye precursor. Preferred for this purpose are cetyl alcohol, stearyl alcohol, stearic acid, palmitic acid, Carbowax, and the like, as well as mixtures thereof. In cases where the copy sheet coating is not sufficiently acidic to develop the dye precursor, it is necessary to incorporate therein small amounts of a weak acid such as lactic acid, benzoic acid, or the like.

It should be understood that the drawings which illustrate the use of three sheets in the thermographic process are set forth only as an illustration and the original sheet may be omitted in cases where the original images are carried upon either side of the master sheet.

Variations and modifications may be made within the scope of the claims and portions of the improvements may be used without others.

I claim:

1. The method of thermographically placing sharp and clear duplicating images on a master sheet by means of original infrared radiation-absorbing images and a transfer sheet which comprises superposing said original images and said master sheet with a translucent transfer sheet having a translucent foundation having at least one neutral plastic outer surface and having a thickness of no more than about 2 mils carrying on the plastic surface thereof a substantially colorless transfer layer having a thickness of no more than about 1 mil and comprising a substantially colorless, solid, undissolved bis (p-dialkylaminoaryl) methane compound which develops an intense dye color when contacted with an acid medium, and an amount of an alkaline stabilizing agent to prevent development of the methane compound by the atmosphere said transfer layer being in surface contact with said master sheet, and exposing said superposed sheets to a light source rich in infrared radiation for a period of time sufficient to heat said original images and cause the transfer layer to melt and transfer to the master sheet in areas corresponding to the location of the original images.

2. The method according to claim 1 in which the transfer layer contains an amine as the alkaline stabilizing agent to prevent premature development of the methane compound.

3. The method according to claim 1 in which the bis (p-dialkylaminoaryl) methane compound is a lactone dye base.

4. The method according to claim 1 in which the bis (p-dialkylaminoaryl) methane compound is a leuco dye base.

5. The method according to claim 1 in which the bis (p-dialkylaminoaryl) methane compound is a carbinol dye base.

6. The method according to claim 1 in which the translucent foundation comprises a heat-resistant plastic film having a thickness of from about 0.5 mil to about 1 mil.

7. A translucent transfer sheet for use in the thermographic method of placing sharp and clear duplicating images on a master sheet, which comprises a translucentt foundation having at least one neutral plastic outer surface and having a thickness of no more than about 2 mils carrying on the plastic surface thereof a substantially colorless transfer layer having a thickness of no more than about 1 mil and comprising a substantially colorless, solid, undissolved bis (p-dialkylaminoaryl) methane compound which develops an intense dye color when contacted with an acid medium, and an amount of an alkaline stabilizing agent to prevent development of the methane compound by the atmosphere.

8. A transfer sheet according to claim 7 in which an amine is present as the alkaline stabilizing agent to prevent premature development of the methane compound.

9. A transfer sheet according to claim 7 in which the bis (p-dialkylaminoaryl) methane compound is a lactone dye base.

10. A transfer sheet according to claim 7 in which the bis (p-dialkylaminoaryl) methane compound is a leuco dye base.

11. A transfer sheet according to claim 7 in which the bis (p-dialkylaminoaryl) methane compound is a carbinol dye base.

12. A transfer sheet according to claim 7 in which the translucent foundation is a heat-resistant plastic film having a thickness of from about 0.5 mil to about 1 mil.

References Cited by the Examiner

UNITED STATES PATENTS

| | | | |
|---|---|---|---|
| 2,755,200 | 7/1956 | Balon et al. | 101—426 |
| 2,755,201 | 7/1956 | Webber et al. | 101—426 |
| 2,769,391 | 11/1956 | Roshkind | 101—149.4 |
| 2,935,938 | 5/1960 | O'Sullivan | 101—149.4 |
| 2,939,009 | 5/1960 | Tien | 101—149.4 X |
| 2,974,585 | 3/1961 | Newman | 101—149.4 |
| 3,048,695 | 8/1962 | Russell | 101—149.4 X |

FOREIGN PATENTS

| | | |
|---|---|---|
| 844,695 | 8/1960 | Great Britain. |

DAVID KLEIN, *Primary Examiner.*

WILLIAM B. PENN, *Examiner.*